G. BEECHING.
Cultivator.
No. 5,859. Patented Oct. 17, 1848.
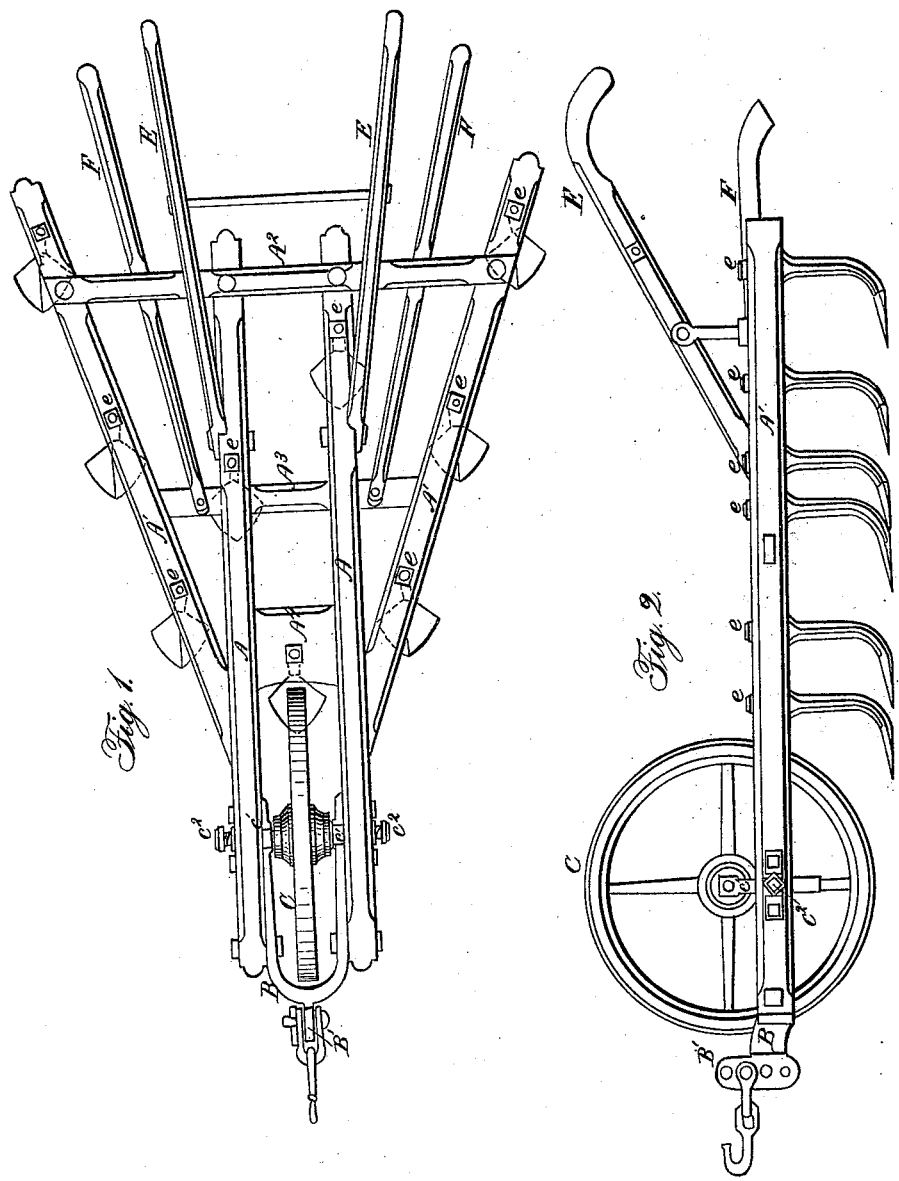

UNITED STATES PATENT OFFICE.

GEO. BEECHING, OF AUGUSTA, NEW YORK.

IMPROVEMENT IN CULTIVATORS.

Specification forming part of Letters Patent No. 5,859, dated October 17, 1848.

*To all whom it may concern:*

Be it known that I, GEORGE BEECHING, of Augusta, in the county of Oneida and State of New York, have invented certain new and useful Improvements in Cultivators, of which the following is a full, clear, and exact description, reference being had to the annexed drawings of the same, making part of this specification, of which—

Figure 1 is a top view, and Fig. 2 a side elevation.

The same letters in the different figures refer to corresponding parts.

The frame of my improved cultivator is composed of two central parallel pieces of scantling, A A, to the outside of which the oblique pieces A' A' are joined by bolts or otherwise at their front ends and by the tranverse piece $A^2$ at their rear ends. To give increased rigidity to the frame the transverse slot $A^3$ is passed through near the middle of the timbers in suitable mortises made for that purpose, and the front ends of the central pieces are joined by the bent staple or U-shaped piece of iron B, bolted to the inner sides of the timbers. The block $A^4$ is for the purpose of holding the center tooth, and is secured between the middle timbers by bolts or otherwise.

Between the front ends of the middle timbers the wheel C is placed. Its journals turn in suitable bearings formed in the upper ends of the adjustable standards c' c'. This wheel is for the purpose of gaging the depth of the furrow and sustaining the weight of the chains or whiffletrees by which the beasts of the draft may be harnessed to the cultivator. When the wheel is adjusted so as to allow the teeth to cut the required depth of furrow it is secured in such position by means of the clamp-screws $c^2$ $c^2$. On the front of the iron B a projecting bar, B', is secured, in which a vertical range of holes are made for the purpose of varying the point of draft. On the sides of this iron rectangular guide-grooves are formed, in which the standards c' slide, and in which they are held by the clamp-screws $c^2$ $c^2$.

To the rear end of the frame the two pairs of handles E E and F F are secured in any suitable way. The handles E E are made and arranged in the usual manner; but the lower handles are placed near the ground, and are spread sufficiently far apart to be out of the way of the feet of the operator while he is holding the upper handles. These lower handles are for the purpose of raising and holding the teeth above the surface of the ground while turning round at the end of a furrow or while passing over a stone or stump.

The teeth are secured in the frame by means of nuts e, which fit upon the upper ends of the shanks, which protrude through the frame, the shanks having screws formed on them corresponding to the screws of the nuts. The teeth are composed of two principal parts— the shanks or standards and the shares or cutters. The cutters are formed of thin pieces of steel, nearly square, having two of their adjacent sides slightly convex. These are to form the cutting-edges, and the angle formed by the meeting of these curved sides is the front or point of the tooth. The length of the transverse diagonal line of the cutter equals the distance from center to center of the furrows, so that in their progress the teeth cut the whole area of the ground passed over by the cultivator.

The shanks are made of a stout bar of wrought-iron, the upper ends being the thickest, and having a collar formed on them to abut against the under side of the frame-timbers for the purpose of bracing them. They gradually taper toward the lower end, where they are bent round, so as to bring the foot, which is flattened out, into nearly a horizontal position, the toe point being a little the lowest. The front edges and point of the foot are tapered down to a feather-edge, the thickest part being in the line of the longitudinal diagonal of the cutter or share, forming a ridge, which is a continuation of the front corner of the shank, and the sloping sides of the foot are continuations of the oblique sides of the front of the same. To the under side of the foot thus formed the steel cutter is welded firmly and then tempered. This completes the lower end or share of the tooth. On the upper end of the tooth a tenon is formed, which is passed through a corresponding mortise made in the frame. On the upper end of this tenon a screw is cut and a nut fitted thereon for the purpose of securing the tooth firmly in the frame.

This implement is designed to be used as a subsoil-cultivator only where the surface soil has been previously plowed up and pulverized. In this case the superstratum offers but little resistance to the progress of the standards through it, and the cross-section of the cutters being so small, they are drawn through the substratum with comparatively little force, two horses being for this purpose quite sufficient, whereas four are required to break up the subsoil by means of any other known implement. By the action of this implement the subsoil is effectually disrupted and scarified at the same time that it is neither inverted nor much displaced, which in many cases is a matter of much importance, particularly where the soil is thin and it is desired to keep it, together with the manure mixed with it, near the surface, but at the same time stir up the subsoil to permit the roots of plants to penetrate beyond the reach of drought. By altering the gage of the depth of the furrow this implement may be used as a surface-cultivator, for which purpose it is well adapted, as the teeth are arranged to plow parallel equidistant furrows and cut over and loosen every part of the ground passed over, thus effectually cutting up the weeds and leaving the soil in excellent condition to receive the seed.

The steel cutter or share, being of tempered steel, is much harder than the iron of the foot to which it is welded. The iron therefore wears away much the faster, which keeps the cutter constantly sharp, and thus rendering it self-sharpening.

I do not claim to be the inventor of the subsoil plow, nor of the many-toothed cultivator, nor of the wheeled and handled cultivator or plow, nor of the triangular cultivator-frame; but What I do claim as my invention, and desire to secure by Letters Patent, is—

1. The construction of quadrangular teeth for cultivators, as described and represented.

2. The construction of the U-shaped iron brace, having a clevis formed on its front and two vertical transverse grooves on its sides, as combined with the parallel timbers A A of the frame and the adjustive standards $c'$ $c'$.

3. The extra handles F F for raising the cultivator in turning at the end of the furrow or going over stones, &c., as described.

GEORGE BEECHING.

Witnesses:
 LEVI T. MARSHALL,
 GEORGE T. HALL.